(12) United States Patent
Liu et al.

(10) Patent No.: US 12,189,349 B2
(45) Date of Patent: Jan. 7, 2025

(54) SYSTEM AND METHOD OF EFFICIENT, CONTINUOUS, AND SAFE LEARNING USING FIRST PRINCIPLES AND CONSTRAINTS

(71) Applicant: Huawei Technologies Co., Ltd., Shenzhen (CN)

(72) Inventors: Lifeng Liu, Boston, MA (US); Yingxuan Zhu, Plano, TX (US); Jun Zhang, Plano, TX (US); Xiaotian Yin, Plano, TX (US); Jian Li, Plano, TX (US); Yongxiang Tao, Shanghai (CN); Dayao Liang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 800 days.

(21) Appl. No.: 17/319,442

(22) Filed: May 13, 2021

(65) Prior Publication Data
US 2021/0341886 A1    Nov. 4, 2021
US 2022/0155732 A9    May 19, 2022

Related U.S. Application Data

(63) Continuation of application No. PCT/CN2019/083895, filed on Apr. 23, 2019.
(Continued)

(51) Int. Cl.
*G05B 13/02* (2006.01)
*B60W 50/06* (2006.01)
(Continued)

(52) U.S. Cl.
CPC ......... *G05B 13/0265* (2013.01); *B60W 50/06* (2013.01); *G06F 16/24578* (2019.01);
(Continued)

(58) Field of Classification Search
CPC .. B60W 60/00; B60W 60/01; B60W 60/0011; B60W 60/0013; B60W 60/0015;
(Continued)

(56) References Cited

U.S. PATENT DOCUMENTS 10,640,111 B1 *   5/2020   Gutmann .......... B60W 60/0027
10,679,497 B1 *   6/2020   Konrardy ......... G08G 1/096725
(Continued)

FOREIGN PATENT DOCUMENTS

CN    106842925 A    6/2017
CN    106873585 A    6/2017
(Continued)

OTHER PUBLICATIONS

Mnih, V., et al., "Human-level control through deep reinforcement learning," Nature, vol. 518, Feb. 26, 2015, 13 pages.
(Continued)

*Primary Examiner* — Daniel Samwel
(74) *Attorney, Agent, or Firm* — Conley Rose, P.C.

(57) ABSTRACT

A computer implemented method for self-learning of a control system. The method includes creating an initial knowledge base. The method learns first principles using the knowledge base. The method creates initial control commands derived from the knowledge base. The method generates constraints for the control commands. The method performs constrained reinforcement learning by executing the control commands with the constraints and observing feedback to improve the control commands. The method enriches the knowledge base based on the feedback.

20 Claims, 7 Drawing Sheets

Related U.S. Application Data

(60) Provisional application No. 62/768,467, filed on Nov. 16, 2018.

(51) Int. Cl.
  *B60W 60/00* (2020.01)
  *G06F 16/2457* (2019.01)
  *B60W 50/00* (2006.01)

(52) U.S. Cl.
  CPC ..... *B60W 2050/0062* (2013.01); *B60W 60/00* (2020.02); *B60W 60/001* (2020.02)

(58) Field of Classification Search
  CPC ......... B60W 60/0016; B60W 60/0017; B60W 60/0018; B60W 60/00182; B60W 60/00184; B60W 60/00186; B60W 60/0023; B60W 50/06; B60W 2050/0062; B60W 60/001; G05B 13/0265; G06F 16/24578
  See application file for complete search history.

(56) References Cited

U.S. PATENT DOCUMENTS

| | | | | |
|---|---|---|---|---|
| 2014/0063232 | A1* | 3/2014 | Fairfield | B60T 7/12 |
| | | | | 382/104 |
| 2018/0074493 | A1* | 3/2018 | Prokhorov | G05D 1/0221 |
| 2018/0189647 | A1* | 7/2018 | Calvo | G06N 3/08 |
| 2019/0204842 | A1* | 7/2019 | Jafari Tafti | G06N 3/08 |
| 2020/0033868 | A1* | 1/2020 | Palanisamy | B60W 40/09 |
| 2020/0346665 | A1* | 11/2020 | Araujo et al. | A61B 5/163 |

FOREIGN PATENT DOCUMENTS

| | | |
|---|---|---|
| CN | 107194612 A | 9/2017 |
| CN | 107506830 A | 12/2017 |
| WO | 2018139993 A1 | 8/2018 |

OTHER PUBLICATIONS

Arulkumaran, K., et al., "A Brief Survey of Deep Reinforcement Learning," IEEE Signal Processing magazine, Special Issue on Deep Learning for Image Understanding, Sep. 28, 2017, 16 pages.

Silver, D., et al., "Deterministic Policy Gradient Algorithms," International Conference on Machine Learning, Beijing, China, 2014, 9 pages.

Lillicrap, T., et al., "Continuous Control with Deep Reinforcement Learning," International Conference on Learning Representations, Published as conference paper at ICLR, 2016, 14 pages.

Emami, P., "Deep Deterministic Policy Gradients in TensorFlow," Updates on my machine learning research, summaries of papers, and blog posts, retrieved from the internet: http://pemami4911.github.io/blog/2016/08/21/ddpg-rl.html, Aug. 21, 2016, 21 pages.

Levine, S., et al., "Guided Policy Search," Proceedings of the 30th International Conference on Machine Learning, PMLR 28(3):1-9, Atlanta, Georgia, USA, 2013, 2 pages.

Levine, S., et al., "Learning Contact-Rich Manipulation Skills with Guided Policy Search," IEEE International Conference on Robotics and Automation, 2015, 3 pages.

Parisotto, E., et al., "Actor-Mimic Deep Multitask and Transfer Reinforcement Learning," International Conference on Learning Representations, Published as a conference paper at ICLR, Feb. 22, 2016, 16 pages.

Kahn, G., et al., "PLATO: Policy Learning using Adaptive Trajectory Optimization," IEEE International Conference on Robotics and Automation, Mar. 2, 2016, 13 pages.

Schulman, J., et al., "Trust Region Policy Optimization," International Conference on Machine Learning, Lille, France, 2015, 9 pages.

Wang, T., "Trust Region Policy Optimization," Machine Learning Group, University of Toronto, retrieved from the Internet: http://www.cs.toronto.edu/~tingwuwang/trpo.pdf, 21 pages.

Kurin, V., "Introduction to Imitation Learning," retrieved from the internet: https://blog.statsbot.co/introduction-to-mitation-learning-32334c3b1e7a, 14 pages.

* cited by examiner

SYSTEM AND METHOD OF EFFICIENT, CONTINUOUS, AND SAFE LEARNING USING FIRST PRINCIPLES AND CONSTRAINTS

CROSS REFERENCE TO RELATED APPLICATIONS

This application is a continuation of International Application No. PCT/CN2019/083895 filed Apr. 23, 2019, by Huawei Technologies Co., Ltd., and titled "System and Methods of Efficient, Continuous, and Safe Learning Using First Principles and Constraints," which claims the benefit of U.S. Provisional Patent Application No. 62/768,467, filed Nov. 16, 2018, and entitled "System and Methods of Efficient, Continuous, and Safe Learning Using First Principles and Constraints," each of which is incorporated by reference.

TECHNICAL FIELD

Embodiments of the present disclosure relate to the field of machine learning, and in particular, to a system and methods of efficient, continuous, and safe learning using first principles and constraints.

BACKGROUND

Machine learning is a computer program that can learn and adapt to new data without human interference. Deep learning is a subset of machine learning. Deep learning is an artificial intelligence (AI) function that imitates the workings of the human brain in processing data and creating patterns for use in decision making. For example, deep learning can infer an outcome from a new, yet to be seen state (or situational input) by generalizing the solution. Deep learning has traditionally been used for image and speech recognition.

Reinforcement learning (RL) is the process of learning through trial and error to discover which actions yield the optimum results. Unlike supervised machine learning, which trains models based on known-correct answers, in reinforcement learning, researchers train the model by having an agent interact with an environment. Deep reinforcement learning (DRL) is a combination of deep learning and reinforcement learning. DRL is a reinforcement learning architecture built on deep neural networks. It uses a deep neural network to replace the Q-network in reinforcement learning, so as to achieve deep learning while at the same time having the characteristics of reinforcement learning—trial and error in continuous learning. DRL is an exciting area of AI research, with potential applicability to a variety of problem areas. However, DRL still has limitations, such as inefficiency and safety issues in learning, discrepancy between learning results in simulation and in real environments, etc.

SUMMARY

The present disclosure describes various embodiments for efficient, continuous, and safe learning using first principles and constraints. As an example, in one embodiment, a method for self-learning of a control system is disclosed. The method includes creating an initial knowledge base. The method learns first principles using the knowledge base. The method creates initial control commands derived from the knowledge base. The method generates constraints for the control commands. The method performs constrained reinforcement learning by executing the control commands with the constraints and observing feedback to improve the control commands. The method enriches the knowledge base based on the feedback.

Additional details of the above aspects and other embodiments, as well as the advantages thereof, are further described in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
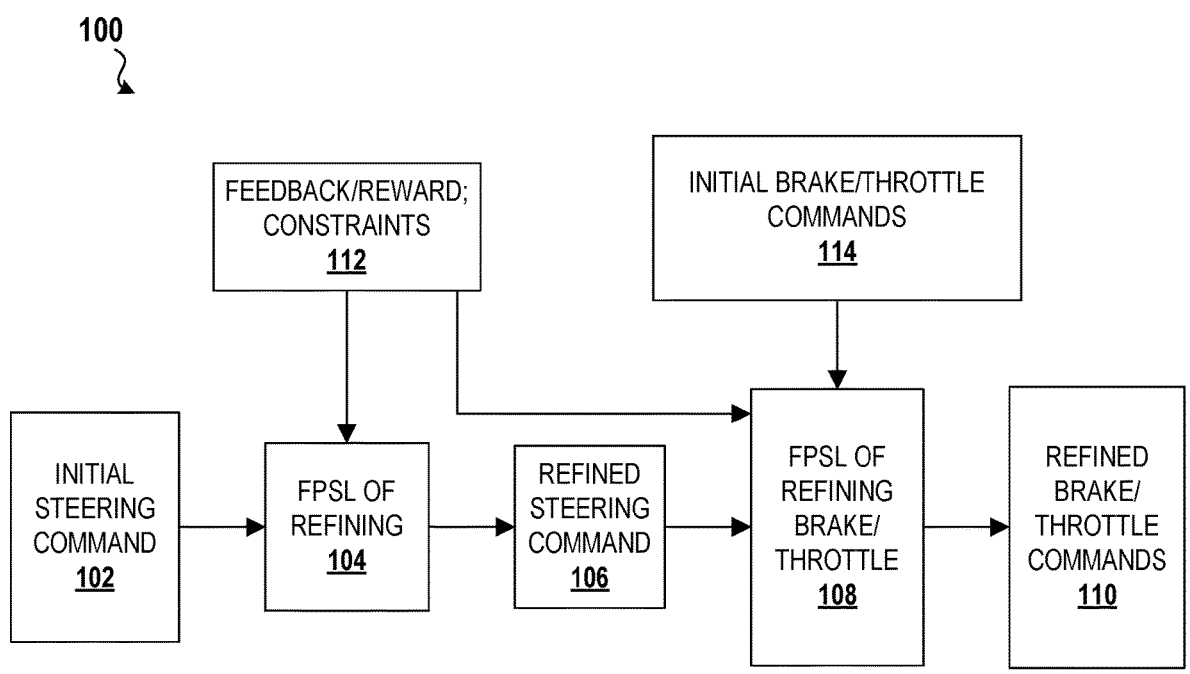
FIG. 1 is a schematic diagram illustrating a method for a vehicle to learn how to follow a lane in accordance with an embodiment of the present disclosure.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

The method and processes described herein can be implemented using a general-purpose computer. For example, the process and algorithms described herein can be realized by software program code in computer memory that is executed using one or more processors or processing units. Thus, when programmed to implement the disclosed processes/algorithms, the general-purpose computer or processor disclosed in the specification is transformed into a special purpose computer programmed to perform the disclosed embodiments.

Disclosed herein are various embodiments of an automated system control that is based on efficient, continuous, and safe learning using first principles and constraints. The disclosed embodiments overcome several challenges associated with current automatic system control. For instance, current automatic system control uses the "trial and error" reinforcement learning method, which takes a long time (a few days to several months) to learn. Certain driving scenarios can be dangerous and it is not acceptable to have continuous learning errors/accidents in a real environment. Second, current automatic system control uses imitation learning (i.e., imitating human behavior). However, learning from the operator/human requires the use of computationally expensive anti-reinforcing learning. The amount of computation in inverse reinforcement learning is too large and difficult to achieve. In addition, people may not be able to provide the best strategy for certain tasks/scenarios. Third, driving control based on accurate physical model requires time-consuming and laborious system control parameters' calibration. Fourth, incomplete training/learning will learn potentially unsafe strategies and cannot deal with unlearned or unseen scenarios.

As will be described herein, the present disclosure provides for various embodiments that provide efficient, continuous, and safe first principles-based constrained self-learning by collecting simplified system and environmental information, using a knowledge base to describe the first principles' manifestation from observing the system operation process, and deriving initial system control commands from the knowledge base. The disclosed embodiments shorten the learning time and avoid complete system control parameters' calibration. The disclosed embodiments also use the first principles and environmental states to generate the constraints corresponding to the safe search space. Additionally, the disclosed embodiments use constraints and principled estimation to evolve machine learning (e.g., reinforcement learning) into principled learning. This enables the ability to deal with unlearned or unseen scenarios in a safe online learning environment.

The disclosed embodiments for providing efficient, continuous, and safe first principles-based constrained self-learning can be applied to various environments. For example, various embodiments can be applied to the learning of autonomous driving in a vehicle, where sensors can be used to determine the perception of the surrounding environment. The system can then learn how to generate appropriate driving control commands (such as the steering wheel angle, acceleration/deceleration, etc.) according to the determined driving target. In some embodiments, to learn the commands of controlling the steering wheel angle and acceleration/deceleration in following lanes (such as high-speed cruise), the calculation of the initial steering angle can be based on the following three factors: the distance from the host vehicle to the lane center, the lane's curvature, and the angle from the host vehicle's orientation to the lane direction. In some embodiments, the calculation of initial acceleration/deceleration can be based on: steering constraints caused by lane curvature, speed limit from speed limit sign, and a level of comfort for passengers. The disclosed embodiments can also be used for learning to control other self-moving systems, such as the motion control of the drone, to make it better to travel along a predetermined path.

Referring now to the drawings, FIG. 1 is a schematic diagram illustrating a method 100 for a vehicle to learn how to follow a lane in accordance with an embodiment of the present disclosure. The method 100 begins at block 102 by calculating the initial steering command. For example, in one embodiment, the calculation of the initial steering command can be based on the following three factors: the distance from the host vehicle to the lane center, the lane's curvature, and the angle from the host vehicle's orientation to the lane direction.

In the depicted embodiment, at block 104, the method 100 uses first principles based self learning (FPSL) for refining the initial steering command based on the feedback/reward and constraints from block 112. FPSL is implemented based on a knowledge base. The feedback/reward is the result of executing a command. Constraints are limitations, boundaries, thresholds, or conditions that the control commands adhere to. The FPSL generates refined steering command at block 106. At block 108, FPSL is then applied to both the refined steering command 106 along with an initial brake/throttle command 114. The FPSL again uses feedback/reward and constraints from block 112 to generate refined brake/throttle commands at block 110.

A similar approach can be applied to learning how to follow another vehicle. For instance, in an embodiment, the process can learn the acceleration/deceleration control commands when following another vehicle (such as low speed following) so as to maintain the desired distance. In some embodiments, the process learns according to the following status elements: the difference between the current distance and the ideal distance; the speed difference between the two vehicles; and the difference in acceleration between the two vehicles.

Figure 2:
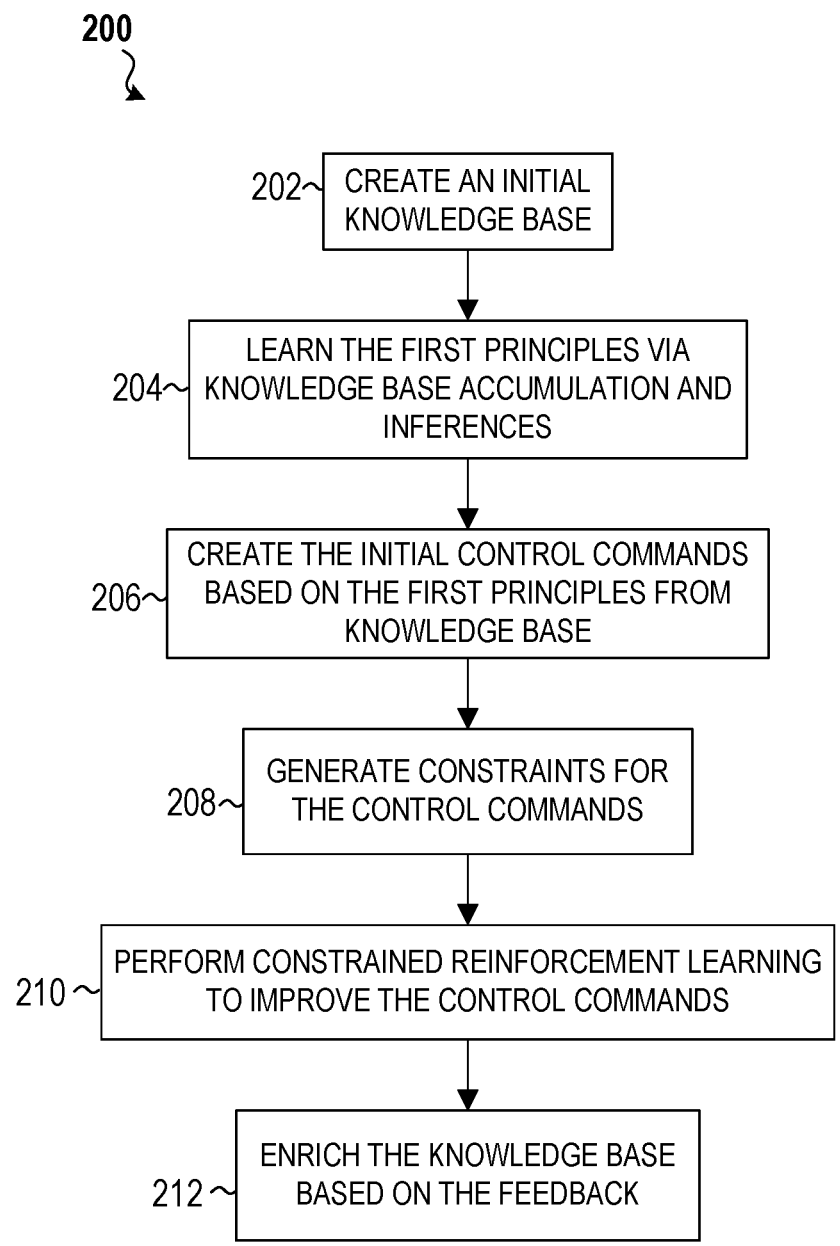
FIG. 2 is a flowchart illustrating a process for efficient, continuous, and safe first principles-based constrained self-learning in accordance with an embodiment of the present disclosure.

FIG. 2 is a flowchart illustrating a process 200 for efficient, continuous, and safe first principles-based constrained self-learning in accordance with an embodiment of the present disclosure. As stated above, in real environments (such as autonomous driving), errors/accidents from continuous learning cannot be afforded. Additionally, trial and error reinforcement learning methods take a long time (a few days to a few months) to learn. Incomplete training/learning will lead to potentially unsafe strategies and cannot handle scenarios that are not learned or unseen. Thus, the disclosed embodiments use constrained reinforcement learning to improve the control commands.

In the depicted embodiment, the process 200, at step 202, creates an initial knowledge base. A knowledge base is a store of information or data that is available to the system to extract information from. The knowledge base contains the underlying set of facts, assumptions, and rules that a computer system has available to solve a problem. An example of a data table that can be included in the knowledge base is shown below in Table 1.

TABLE 1

| Speed | Steering angle | Curve radius of the lane | Vehicle orientation changing rate |
|---|---|---|---|
| 50 kmh | 2 degrees | 100 m | 0.2 degrees |

In the above embodiment, the data table includes a column for speed, steering angle, curve radius of the lane, and vehicle orientation changing rate. The content of the initial knowledge base can be safely obtained by driving the vehicle in the parking lot or a training site. For example, the vehicle can be set to the expected speed, and then the corresponding deceleration commands are sent. The process can then measure the distance and time to stop. For instance, as shown in Table 1, at a speed of 50 kilometers per hour (km/h), the steering angle is 2 degrees, the curve radius of the lane is 100 meters (m), and the vehicle orientation changing rate is 0.2 degrees/second. Additionally, the process can set the vehicle to the desired speed, send the appropriate steering wheel angle command, and measure the curvature of the path the vehicle is passing.

Figure 3:
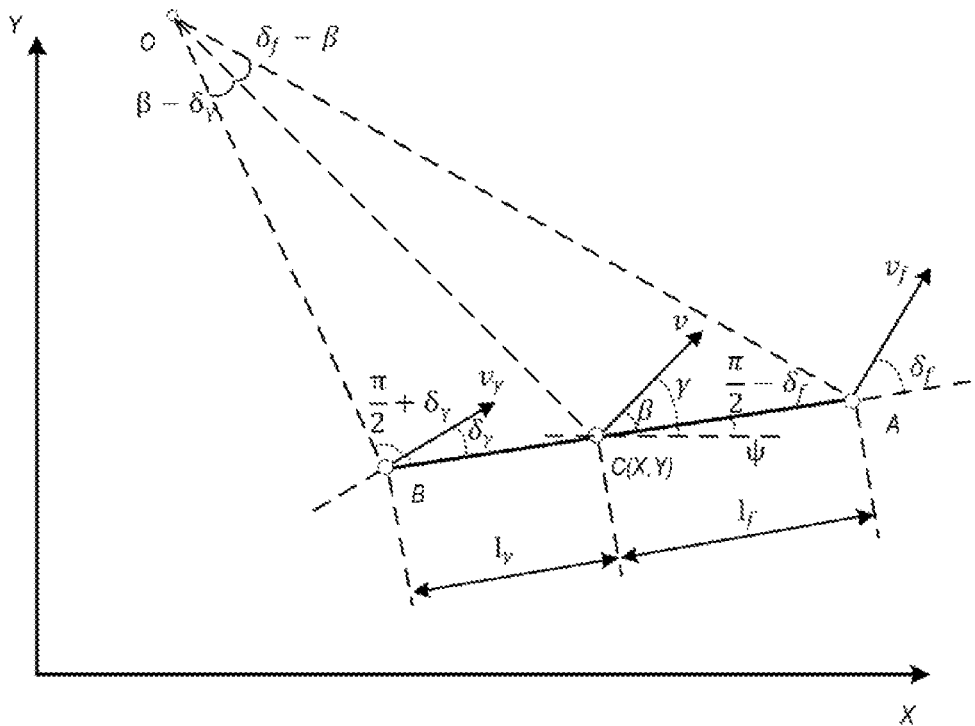
FIG. 3 is a graph illustrating kinematics that can be used to estimate the structural parameters of a vehicle using the knowledge base in accordance with an embodiment of the present disclosure.

At step 204, the process 200 learns the first principles via knowledge base accumulation and inferences. The knowledge base provides the functions of reasoning, fitting, and querying. For example, FIG. 3 is a graph illustrating kinematics that can be used to estimate the structural parameters (mass, wheelbase, center of gravity) of the vehicle using the knowledge base in accordance with an embodiment of the present disclosure. In an embodiment, the following steering equations can be used in reference to FIG. 3 for the fitting/generation of the corresponding wheel angles ($\delta_\gamma$, $\gamma_f$) under different environmental conditions.

$$\dot{X} = v\cos(\psi + \beta)$$

$$\dot{Y} = v\sin(\psi + \beta)$$

$$\dot{\psi} = \frac{v\cos\beta(\tan\delta_f + \tan\delta_\gamma)}{l_f + l_\gamma}$$

where $$\beta = \arctan\frac{l_f\tan\delta_\gamma + l_\gamma\tan\delta_f}{l_f + l_\gamma}$$

and $$v = \frac{v_f\cos\delta_f + v_\gamma\cos\delta_\gamma}{2\cos\beta}$$

For example, when driving at different speeds, the process 200 can query the appropriate steering angles under different curvatures of different roads (e.g., expectedSteeringAngle=QuerySteeringAngleFromKB(roadCurvature, currentSpeed)).

In another embodiment, via data mining in KB, the system can establish the relationship between dynamics/kinematic parameters and vehicle control parameters. Based on the data accumulation, the dynamics/kinematic parameters are calculated using simplified dynamics/kinematics formulas, and used for generating control commands. For example, in some embodiments, to learn acceleration control, the factors of acceleration that are considered can include rolling resistance (Fr), air resistance ($F_d$): depending on the coefficient of friction, car shape, speed, etc., and forward force (Fw): controlled via throttle. The acceleration force (F)=Fw-$F_d$-Fr=ma. In an embodiment, the required derived knowledge can include coefficients for calculating Fr and $F_d$, how to calculate Fw from the percentage of maximum throttle, and the control commands' range/limitation for different scene types.

The following table compares simplified formulas versus the original formulas that can be used for determining rolling resistance (Fr), air resistance ($F_d$), and forward force (Fw) in accordance with some embodiments.

| Simplified formulas | Original formulas |
|---|---|
| Fr = c1 * mg | Fr = $r_r$ mg |
| $F_d$ = c2 * $v^2$ | F = ½ * $C_d$A$\rho v^2$ |
| | F = force due to air resistance |
| | $C_d$ = the drag coefficient |
| | A = the area of the object the air presses on (m²) |
| | $\rho$ = the density of the air the object moves through (kg/m³) |
| | v = the velocity of the moving object (m/s) |
| $F_w$ = c3 * percentage of maximum throttle | $Fw = \frac{T_E R g_k}{d/2}$ |

In an embodiment, the simplified formula for vehicle acceleration is a=(Fw−Fr−Fd)/m. Unknowns to learn: c1, c2, c3, and m. a and v are observations, and unknowns can be calculated from enough samples (using least squares).

In some embodiments, the following formulas can be used to learn braking control. For constant deceleration, the stop time is t=v/a. The formula for stop distance (linear relationship with the square of the velocity) is $$x = vt - \frac{1}{2}at^2.$$

The required derivative knowledge is how to map the percentage of maximum torque to a:

$$T = \frac{BF_w R}{r}$$

where:
T=brake torque (Nm)
BFw=braking force for the wheel (N)
R=static laden radius of the tire (m)
r=speed ratio between the wheel and the brake In some embodiments, simplified steering control formula is: $\delta f$=c5*normalized steering angle. Unknowns to learn: c5.

In some embodiments, the above derivative knowledge/ unknowns to be learned can be estimated by a small amount of data collection. The derivative knowledge can then be used for online learning and refining their representations.

Referring back to FIG. 2, at step 206, the process 200 creates the initial control commands based on the first principles learned from the knowledge base. For example, in some embodiments, the dynamic/kinetic models learned from the knowledge base or the acquired manifestations of the first principles, as well as the expected target, are used for creating the initial control command. Thus, there is no need for accurate physical models, as currently being used, which requires time-consuming and labor-intensive system control parameters' calibration. Instead, the initial control commands can be generated according to the above learned parameters, such as according to the curvature (curvature) of the road, the required $\delta_f$ (wheel angle) can be calculated, and then the corresponding normalized steering angle can be calculated using c5.

Figure 4:
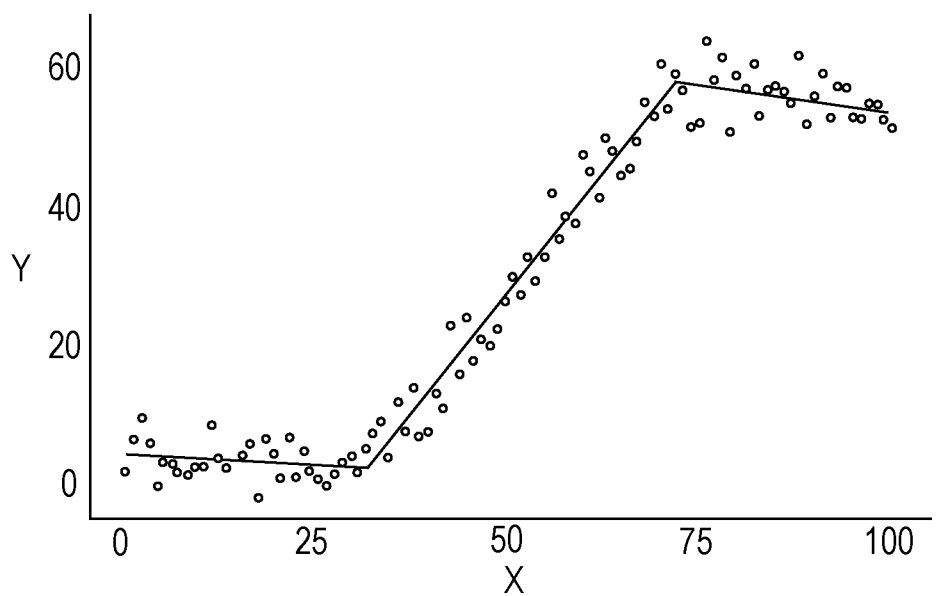
FIG. 4 is a graph illustrating a piecewise linear fitting method in accordance with an embodiment of the present disclosure.

For instance, in an example embodiment, the process 200 can generate a vehicle control command by calculating steering instruction for the steering wheel based on a road curvature estimation and the knowledge base, calculating the corrective control command based on the deviation of the vehicle from the desired travel direction, and calculating the speed/acceleration based on the travel distance/time to the next target. The process can then calculate the throttle/brake command using the knowledge base. These are based on the reasoning, fitting, and query functions provided by the knowledge base. A simple example is the piecewise linear fitting method shown in FIG. 4. An example algorithm for creating the initial control commands based on the first principles from knowledge base is further described in FIG. 5.

At step 208 of FIG. 2, the process 200 generates constraints for the control commands. As stated above, constraints are limitations, boundaries, thresholds, or conditions that the control commands adhere to. Constraints are used to avoid dangerous situations such as errors/accidents in real-world environments (such as autonomous driving). In accordance with the disclosed embodiments, there are two types of constraints, hard constraints and soft constraints. Hard constraints have rigid limits (i.e., must conditions), whereas soft constraints have flexible limits (i.e., preferable conditions). Non-limiting examples of hard constraints can include maintaining a safe distance/safe response time from obstacles or other moving objects in the environment, preventing slipping and derailment, and keeping operating commands within the operating range of the system (acceleration/braking limits, matching between steering angle and speed, etc.) Non-limiting examples of soft constraints can include maintaining comfort, maintaining stability, and providing fuel efficiency.

In some embodiments, constraints can be expressed as boundaries of control commands and are easily used to limit the exploration space in the reinforcement learning. For example, as shown below, Table 2 provides examples of representations of state-based constraints and Table 3 provides examples of representations of speed-based constraints.

state. Therefore, the disclosed embodiments avoid the limitations of the predetermined constraints and loss functions in terms of flexibility and scalability. An example of an algorithm for generating constraints is further described in FIG. 6.

At step 210 of FIG. 2, the process 200 performs constrained reinforcement learning to improve the control commands. Constrained reinforcement learning enables the process 200 to learn while avoiding errors/accidents in real environments (such as autonomous driving) and reduces normal learning time. In some embodiments, constrained reinforcement learning includes decomposing learning tasks such as learning speed control and steering control separately. For example, the steering control can include the steering control of following the curved lane, the steering control of the lateral speed (to approach the next target from the current position), and the steering control of vehicle orientation (to keep the vehicle orientation the same as the lane direction). These steering controls can be learned separately and used in the proper combinations. Thus, the process 200 can be configured to learn basic tasks first before learning combination tasks; learn simple tasks before learning complex tasks; and learn the prerequisites for tasks before learning the tasks themselves.

In some embodiments, constrained reinforcement learning can include constrained exploration where constraints are used to reduce an exploration space. For example, a selection of an action or command must be within the boundaries represented by the constraints (soft constraints and hard constraints). Using FPSL, the new operational command to attempt must satisfy the constraints (based on the scope of operation and reliability/safety) and also follow the knowledge derivation from the learned knowledge base (based on curve fitting or interpolation or extrapolation).

Based on the driving experience collected in the knowledge base, for the operation command candidates, the process 200 can preview the status/effect of the host vehicle at next the step(s), and optimize the operation command (e.g., estimatedReward is based on the result of computeNextCarPose (KB, currentActions, currentState)). Based on the tried operation commands and the observed effects, the process 200 can compute the gradient direction to generate better operation command candidates. In an embodiment, the choice of operational commands is based on feedback/observation from previously selected actions, and is therefore not a random pick, but an intelligent choice based on past experiences and the knowledge base. According to the operation command/effect feedback, the process 200 can

TABLE 2

| State | Constraint | Based on |
|---|---|---|
| Lane curvature; Distance to the ahead vehicle; Speed of the ahead vehicle; Speed limits of the lane | Upper limit of speed: MaxSpeed | Road friction coefficient and first principles of vehicle motion; Safety distance/response time (e.g., 3 second rule) |
| Distance to the behind vehicle; Speed of the behind vehicle; Speed limits of the lane | Lower limit of speed: MinSpeed | First principles of vehicle motion; Safety distance/response time |
| Road curvature The position of the car in the road relative to the position of other moving objects. | The average steering angle. Range of steering angles: [minAngle, maxAngle] | First principles of vehicle motion At the next timestamp, there will be a safe distance from other objects, curbs, etc. |

TABLE 3

| Speed limit range | Constraint | Based on |
|---|---|---|
| Upper limit of speed | Upper limit of acceleration | first principles of vehicle motion |
| Lower limit of speed | Upper limit of deceleration/braking | first principles of vehicle motion |

In some embodiments, the generation of constraints can be independent of the learning algorithm and can be updated in real time according to changes in the environment and calculate the adjustment direction of the improvement command in case the same state is encountered again. For example, if the selected steering angle causes overshoot, the next time, the adjustment will be reduced (and vice versa).

Additionally, the process 200 can adapt to the new environments by learning from the previous states to help with the selection of operational commands in the new states (avoid random command selection). As an example, in some embodiments, the process 200 can apply the learning results at low speed to the command generation at high speed, or apply adjustments made when turning a sharp curve by means of experiences of turning on smooth curves. A detailed example of an algorithm for performing constrained reinforcement learning is further described in FIG. 8.

Referring back to FIG. 2, at step 212, the process 200 enriches the knowledge base based on the feedback. The term enrich or enriching means that the knowledge base is updated or modified (e.g., existing data is adjusted or new data is added) that improves the information contained in the knowledge base. For instance, by enriching the knowledge base based on the feedback, observed actions/effects are consistently used to improve the reasoning power of the knowledge base. Additionally, the process 200 can select new control commands based on experiences learned from old behaviors, explore in the state/action space, and gradually improve the knowledge base (no sudden jumps in states/actions during learning). In some embodiments, after the knowledge base is rich, the process 200 can be used as a "teacher" policy for supervised deep learning or "teacher" based self-play reinforcement learning (to replace or further optimize the knowledge base's fitting function: from linear fit to non-linear fit).

Figure 5:
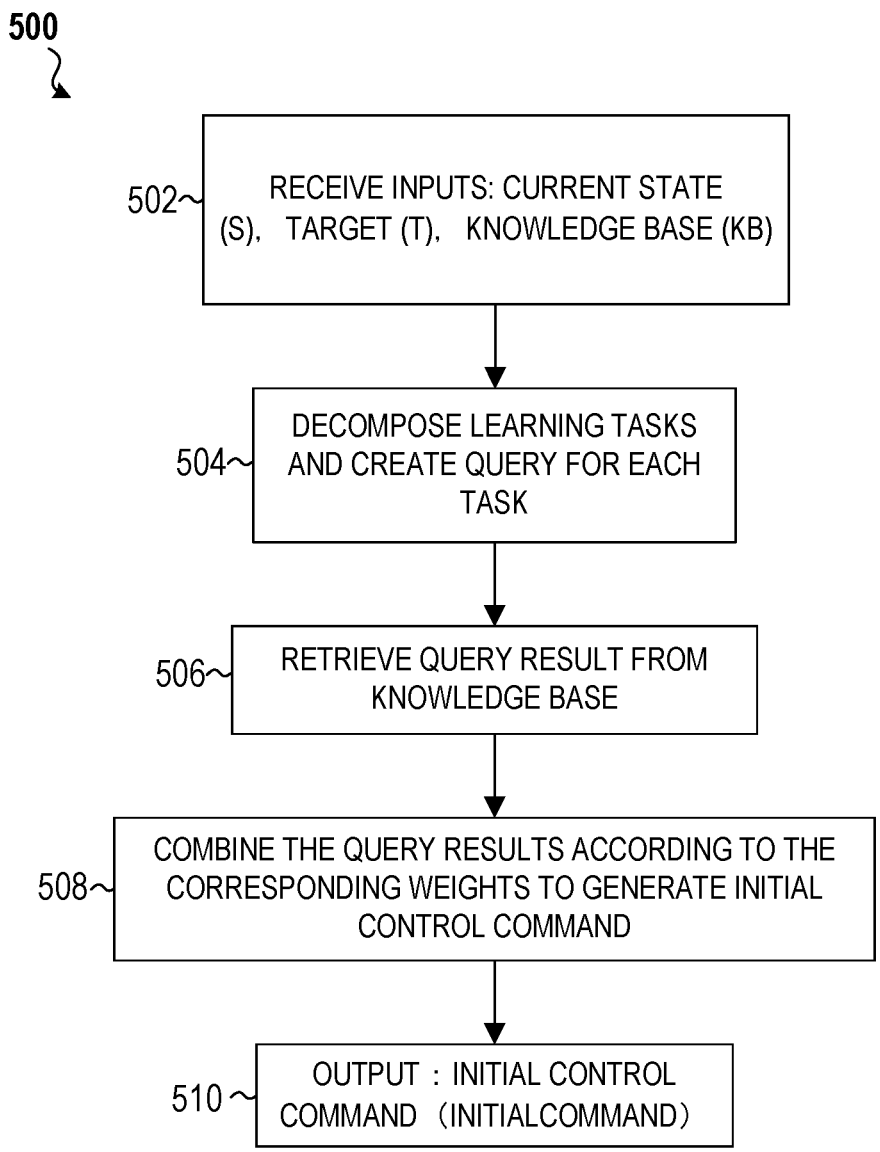
FIG. 5 is a flowchart illustrating a process for creating initial commands in accordance with an embodiment of the present disclosure.

FIG. 5 is a flowchart illustrating a process 500 for creating initial commands in accordance with an embodiment of the present disclosure. The process 500 begins, at step 502, by receiving a current state (S), a target (T), and a reference to the knowledge base (KB) as input parameters. The current state represents the current conditions. The target represents the next desired state (e.g., the target can be to follow a lane or a curvature of a road).

At step 504, the process 500, according to the current state and target, decomposes learning tasks into separate components and creates corresponding query items for each of the tasks (query1, query2, ... ). As an example, while driving on a curve, the steering wheel control can be broken down into the following components: (1) The steering control to follow the curved lane, (2) adjustment based on the lateral distance from the center line of the lane, and (3) adjustment based on the direction deviation of the vehicle's orientation from the lane direction.

At step 506, the process 500 retrieves query results from knowledge base. For instance, for each query item, the process 500 finds the corresponding table or module in the knowledge base and retrieves the corresponding query result ($subCommand_1$, $subCommand_2$, ... ).

At step 508, the process 500 combines the query results according to the corresponding weights to generate an initial control command (InitialCommand=$\Sigma_{i=1}^{n}$ wi*subCommandi). In an embodiment, the initial weight values can be set to 1/n or empirical values, which can be optimized through supervised learning through knowledge accumulation. At step 510, the process 500 outputs the initial control command (InitialCommand).

Figure 6:
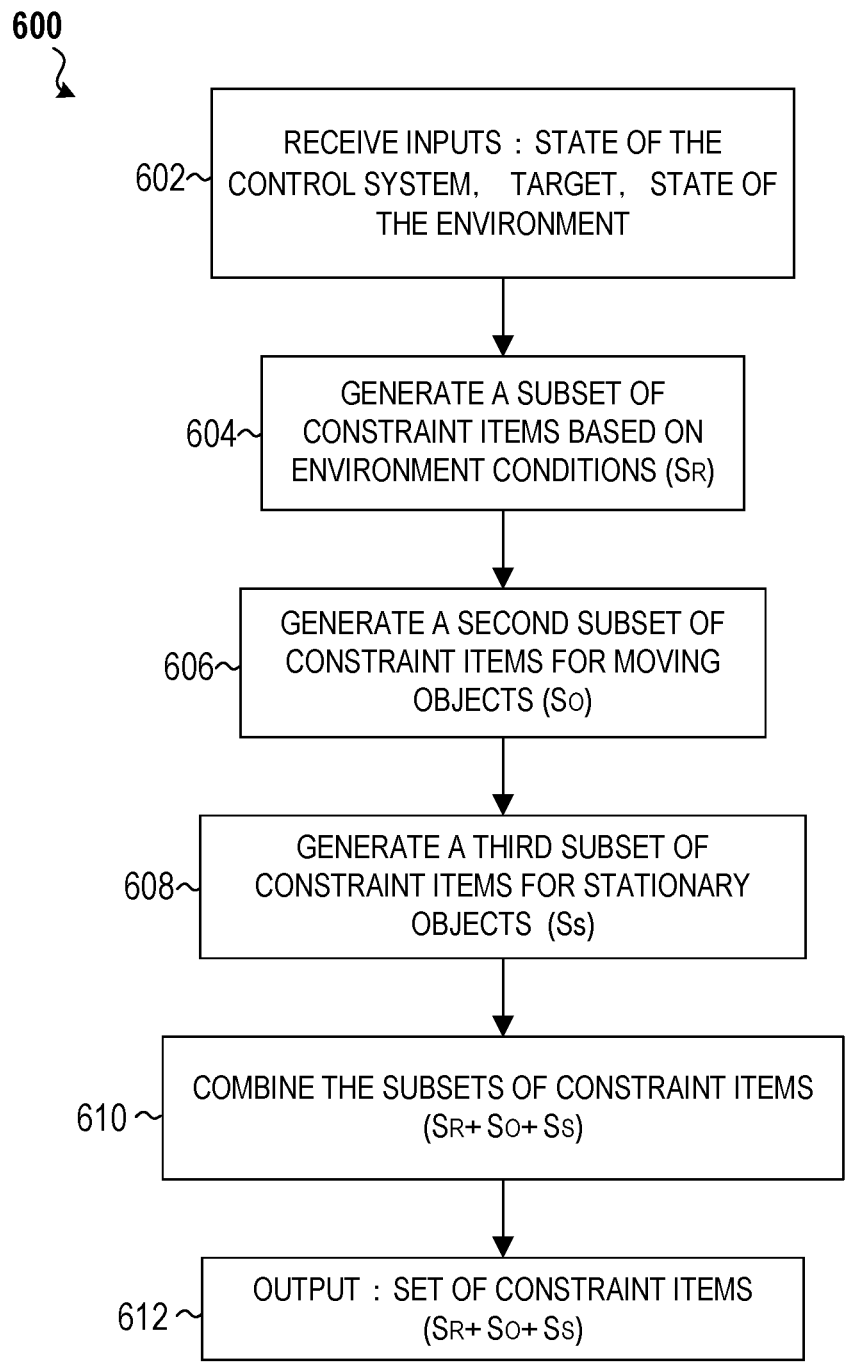
FIG. 6 is a flowchart illustrating a process for generating constraints in accordance with an embodiment of the present disclosure.

FIG. 6 is a flowchart illustrating a process 600 for generating constraints in accordance with an embodiment of the present disclosure. The process 600 begins, at step 602, by receiving a state of the host system, target, and a state of the environment as input parameters. For example, the state of the environment can include the state/condition of a road, obstacles, and other moving objects.

At step 604, based on state of the environment, the process 600 generates a subset of constraint items (Sr). For example, based on the road curvature, the process 600 can generate the upper limit of the turning speed (MaxSpeed), and the range for the steering angles (SteeringAngle_Low, SteeringAngle_High). Based on the estimation of the road friction coefficient, the process 600 can generate the upper limits of acceleration and deceleration (MaxAcceleration).

At step 606, the process 600 generates a second subset of constraint items for moving objects (So). For instance, in some embodiments, based on the state of the host vehicle and the next driving target/path, the process 600 can filter the other moving objects, and for the remaining moving objects, generate the second subset of constraint items (So). As an example, if the current driving path is following lane, the process 600 only keeps the ahead vehicle and the behind vehicle in the same lane; if changing lanes, the process 600 keeps the vehicles/moving objects within a distance range (for safety purpose) in the target lane; and if passing an intersection, the process 600 keeps the passengers/vehicles around the target driving path. For every object passing the filtering, the process 600 can generate a constraint item to avoid collision, which can include the object's size, speed, moving direction, etc. The process 600 includes the generated constraint item in the second subset of constraint items (So).

At step 608, the process 600 generates a third subset of constraint items for stationary objects (Ss). For example, in some embodiments, the process 600 can filter the detected stationary objects/obstacles. For example, if the current driving path is following lane, the process 600 only keeps the ahead obstacles in the same lane; and if passing an intersection, the process 600 keeps the curb information around the target path. For every stationary obstacle passing the filtering, the process 600 can generate a constraint item for the trajectory planning, which keeps the virtual driving lane or the expected/target driving trajectory away from these objects. The process 600 includes the generated constraint item in the third subset of constraint items for stationary objects (Ss).

At step 610, the process 600 combines the subsets of constraint items. At step 612, the process 600 outputs the set of constraint items: Sr+So+Ss.

Figure 7:
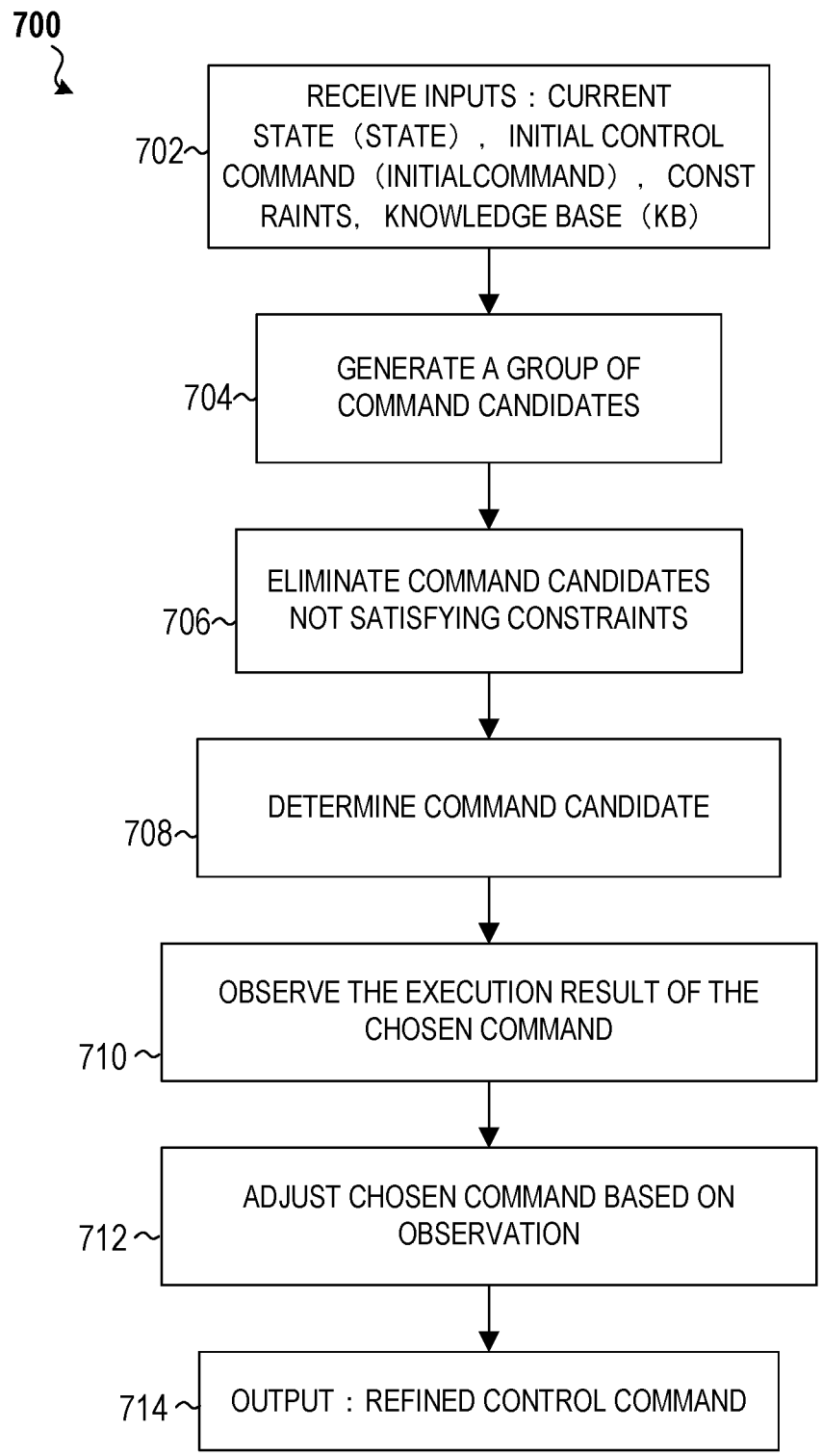
FIG. 7 is a flowchart illustrating a process for performing constrained reinforcement learning in accordance with an embodiment of the present disclosure.

FIG. 7 is a flowchart illustrating a process 700 for performing smart constrained reinforcement learning (smart constrained RL) in accordance with an embodiment of the present disclosure. The process 700 begins, at step 702, by receiving a current state (state), initial control command (InitialCommand), constraints, and a reference to the KB as input parameters. Based on the initial control command (from KB.findInitialCommand(state)), the process 700, at step 704, generates a group of command candidates (Scommands). For example, in an embodiment, the process 700 can use a group of scale factors (e.g., 0.8, 0.85, 0.9, ... , 1.2) to scale the InitialCommand to generate the group of command candidates.

At step 706, the process 700 eliminates command candidates that do not satisfy the constraints. For example, the process 700 can check each of the command candidates in the command candidates group (Scommands) and only keep the command candidates satisfying the constraints. In some embodiments, the process 700 can determine whether a command candidate satisfies a constraint by previewing the state (e.g., the host vehicle's current location, obstacles' locations in the constraints, etc.) for the next couple of timestamps and determining whether the command candidate passes a safety check.

At step 708, the process 700 determines/selects a command candidate from the command candidates satisfying the constraints. In some embodiments, the selection of the command candidate can be based on whether the current state is a learned state (i.e., a state already learned/previously encountered) or a new state. For example, in an embodiment, if the current state is a learned state, the process 700 can find the command candidate with the best estimated reward, and check whether it is marked with how to refine this command for further trial (see step 712). If it is not marked, the process 700 outputs this command at step 714. If it is marked, the process 700 can adjust the command along the gradient direction at step 712, and output the adjusted command at step 714.

However, if the current state is a new state and not a learned state, the process 700 can browse the nearby states (in different dimension directions of the states) to see whether there are learned states nearby. If the process 700 finds a learned nearby state, the process 700 can identify the best command candidate associated with the learned states nearby and adapting the best command candidate of the nearby learned state to the current state as the command candidate. Alternatively, in some embodiments, if the current state is a new state, when the KB accumulates to a certain extent, the process 700 can preview the state and reward of the commands based on the KB. For example, the process 700 can loop through each command in the command candidates group (Scommands) and compute their reward based on the KB, and if the reward of a command based on the KB is better/greater than the rewards of the other commands in the command candidates group, then the command is kept.

At step 710, the process 700 can observe the execution result of the chosen command. Additionally, the process 700 can update the corresponding rewards related with the command (e.g., update Q learning table or SARSA table). For example, based on the observation result, if the result is undershoot (e.g., reward is negative), the process 700 can mark the selected action to increase in the next trial. Similarly, if the result is overshoot (e.g., the sign of one dimension in the state changed), the process 700 can mark the selected action to decrease in the next trial. In some embodiments, the process 700 can check for overshoot/undershoot based on a sequence of <action, result> so as to reduce the influence of delayed execution of the control commands, accelerate the learning, and improve the smoothness of driving. For example, in learning to follow a lane with a specified speed, for a sequence of <steering angle, next-State> on a lane with the same curvature, the process 700 can find the variance of steering angles, and if the variance is greater than a variance threshold, the process 700 can calculate the medium (or average) value of steering angles (i.e., an expected value). For each steering angle in the sequence, if the steering angle is less than the expected value, the process can mark the action as increasing for the next trial. Similarly, if the steering angle is greater than the expected value, the process can mark the action as decreasing for the next trial.

At step 712, if needed, the process 700 can adjust or refine the generation of the chosen command based on the observation of the result of the chosen command. For example, the process 700 can pan the corresponding coefficients of the candidate command so as to make the best command (or the candidate command for the next trial) be centered; or reduce the spacing between candidate commands. At step 714, the process 700 outputs the command with the best reward.

As described herein, the disclosed embodiments enable efficient, continuous, and safe learning using first principles and constraints. In accordance with various embodiments, learning tasks can be decomposed, learning processes can be generated to gradually expand the knowledge base, and the process can learn from simple to complex, slow to fast, so as to build/improve the knowledge base. Extrapolation and data fitting can be used to adapt to new scenarios and transfer learned skills to new vehicles or new scenarios. Other aspects of the disclosed embodiments include collecting simplified system and environmental information, using the knowledge base to describe the first principles' manifestations from the system's operation process, and using the KB to derive initial system control commands. The first principles and environmental states can be used to generate constraints corresponding to the reduced search space. In various embodiments, the constraints can be generated based on the requirements of safety, the empirical accumulation of operational boundaries, the manifestations of the first principles of motion, the corresponding environmental states, and the balance of various influencing factors. The disclosed embodiments can optimize motion control commands using smart constrained RL and reasoning. For example, based on the tried control commands and the effects from the observations, the disclosed embodiments can calculate the gradient direction for generating/refining the control commands candidates (to try next time). As stated above, the disclosed embodiments can use the learned states to assist in adapting to the new environment and the choice of control commands in the new states. The disclosed embodiments can improve the model through continuous learning.

Additionally, as shown in the above example embodiments, smart constrained RL can be used to optimize the control commands for the vehicle, compensate for the inaccuracy in estimation of the first principles of vehicle motion, and conduct constrained reinforcement learning through guided exploration. The disclosed embodiments can be applied to other applications as well such as, but not limited to, learning robotic motion/walking control commands, motion planning learning, and learning medical surgical robots' operation.

The disclosed embodiments provide several technical advantages over current technology including improving the accuracy of skills and adaptability in new scenarios, supporting continuous online learning, eliminating the reliance on big data technologies such as DRL, reducing the exploration space in reinforcement learning using constraints, enhancing learning robustness, significantly improving learning efficiency, and ensuring the safety of learning while requiring fewer parameters and fewer samples. Additionally, the knowledge representation and enhancement are based on dynamic/kinematic models, and are beneficial to transfer knowledge/skills between different vehicles and between different scenes.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

Figure 8:
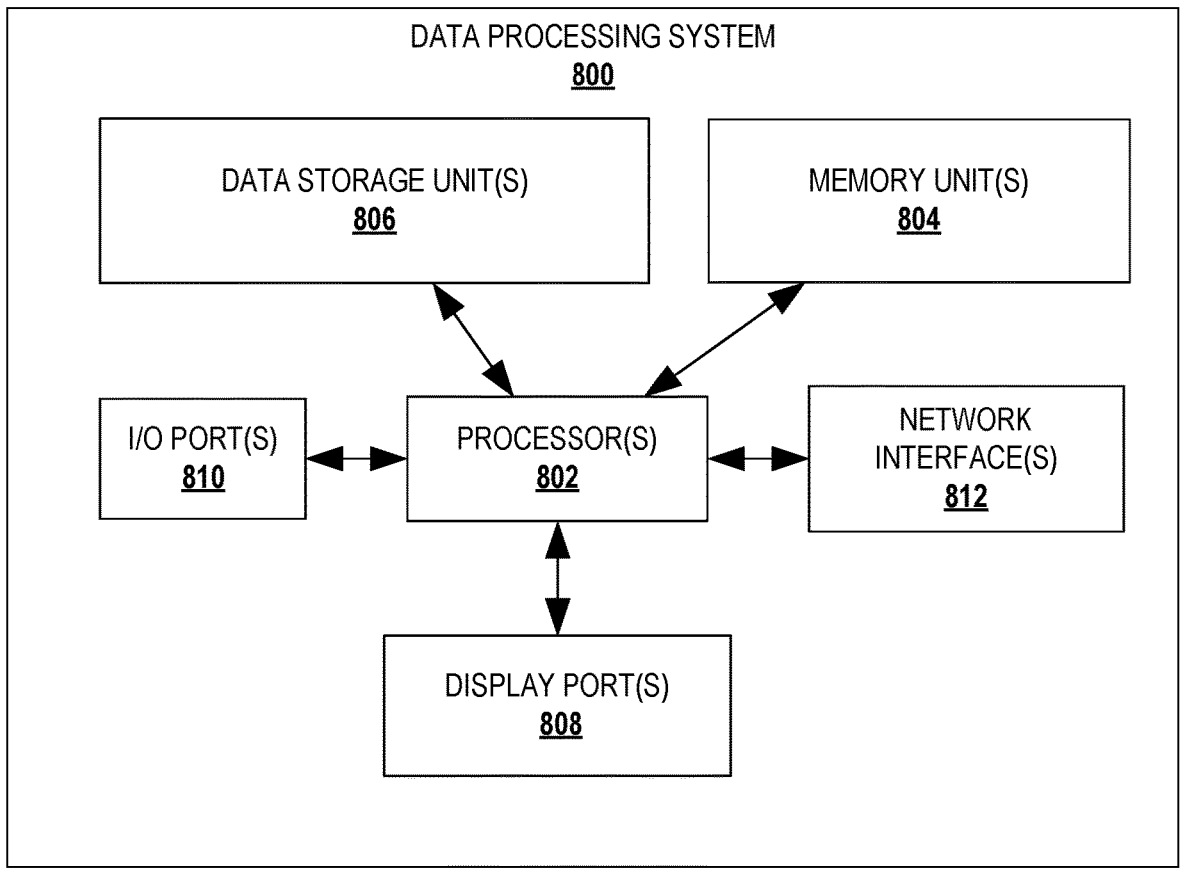
FIG. 8 is a block diagram of an example data processing system in which aspects of the illustrative embodiments may be implemented.

FIG. 8 is a block diagram of an example data processing system 800 in which aspects of the illustrative embodiments may be implemented. In the depicted example, data processing system 800 includes one or more hardware processing units/processors 802, one or more memory units 804, one or more data storage units 806, one or more display ports 808, one or more input/output (I/O) ports 810, and one or more network interfaces 812. The components of the data processing system 800 are coupled to a motherboard/main circuit board that includes a computer bus that enables communication between the various components of the data processing system 800. The computer bus may be implemented using any type of communication fabric or architecture that provides for a transfer of data between different components or devices attached to the fabric or architecture.

Memory unit(s) 804 can be any type of memory capable of storing data and computer executable instructions. In an embodiment, memory unit(s) 804 is volatile memory such as, but not limited to, RAM. Volatile memory is computer storage that maintains its data only while the data processing system 800 is powered. Volatile memory typically provides for faster read/write operations than non-volatile memory. For example, the data storage unit(s) 806 can be non-volatile memory such as hard drive. Different types of hard drives such as solid-state drives (SSD) or traditional hard disk drives (HDD) can be used. Data storage unit(s) 806 can also store data and computer executable instructions. For example, the data storage unit(s) 806 can store an operating system (OS) that is configured to manage the hardware and software resources of the data processing system 800. The OS can also provide common services for computer programs such as scheduling tasks, executing applications, and controlling peripherals. In some embodiments, the data storage unit(s) 806 can be used to store the KB and the computer executable instructions corresponding to the disclosed embodiments.

Processor(s) 802 can be any type of processor capable of executing the computer executable instructions. In some embodiments, the processor(s) 802 may also include its own on-board memory or cache for fast retrieval of data/instructions. Display ports 808 provide an interface for connecting a display device to the data processing system 800 for enabling the display of information to a user. I/O ports 810 provide an interface for connecting input/output devices to the data processing system 800. For example, the I/O ports 810 can enable a keyboard and mouse to be connected to the data processing system 800 for enabling user-input. The network interfaces 812 enable the data processing system 800 to be couple to a communication network for enabling communication to another device. For example, the network interfaces 812 can be a network interface controller, a Wi-Fi adapter, a cable modem, or an Ethernet card.

In some embodiments, additional instructions or data may be stored on one or more external devices. The processes for illustrative embodiments of the present disclosure may be programmed as computer-executable instructions using any type of programming language. The computer-executable instructions can be stored in the data storage units 806 or memory units 804. The processor(s) 802 can execute the computer-executable instructions stored in the data storage units 806 or memory units 804 to perform one or more tasks associated with the disclosed embodiments.

What is claimed is:

1. A computer implemented method for self-learning of a control system, the method comprising:
   creating a knowledge base comprising data obtained from real-world experiments;
   learning first principles using the knowledge base, wherein the first principles are foundational principles that cannot be deduced from other principles, and wherein learning the first principles is based on kinematic parameters of motion of an object, estimated structural parameters of the object, and a relationship between the kinematic parameters and control parameters of the object based on the estimated structural parameters of the object;
   creating control commands for controlling the object based on the first principles derived from the knowledge base;
   generating constraints for the control commands;
   performing constrained reinforcement learning by executing the control commands with the constraints,
   utilizing feedback from the constrained reinforcement learning to improve the control commands; and
   enriching the knowledge base based on the feedback.

2. The method of claim 1, wherein the object is a vehicle, and wherein the first principles comprises first principals of vehicle motion.

3. The method of claim 1, wherein creating the control commands derived from the knowledge base comprises receiving a current state, a target state, and a reference to the knowledge base as input parameters.

4. The method of claim 3, wherein creating the control commands derived from the knowledge base comprises:
   breaking a control task down into separate components according to the current state and the target state;
   creating a query for each of the separate components of the control task;
   retrieving a corresponding query result from the knowledge base for each query to generate a plurality of query results; and
   combining the query results to generate a control command for the control task.

5. The method of claim 4, wherein the query results are combined according to corresponding weights assigned to the separate components of the control task.

6. The method of claim 1, wherein the constraints for the control commands include hard constraints that specify conditions that cannot be exceeded.

7. The method of claim 1, wherein the constraints for the control commands include soft constraints that specify preferable conditions.

8. The method of claim 1, wherein generating constraints for the control commands comprises:
   generating a first subset of constraint items based on a state of an operating environment;
   generating a second subset of constraint items for a set of filtered moving objects based on a state of a host machine and a target state;
   generating a third subset of constraint items for a set of filtered stationary obstacles; and
   combining the first subset of constraint items, the second subset of constraint items, and the third subset of constraint items.

9. The method of claim 1, wherein performing the constrained reinforcement learning to improve the control commands comprises:
   decomposing the control commands into multiple categories and dimensions to enable learning of the control commands in each category and dimension separately;
   generating control command candidates for a control command based on a current state;
   applying the constraints to the control command candidates;
   refining the control commands based on past experiences when the current state is a learned state; and
   adapting results from learned states to new environments when the current state is not the learned state.

10. The method of claim 1, wherein enriching the knowledge base based on the feedback comprises refining a manifestation of dynamics and kinematics models of the knowledge base.

11. A system comprising
a memory storage unit comprising instructions; and
one or more processors in communication with the memory storage unit, wherein the one or more processors execute the instructions to:
create a knowledge base comprising data obtained from real-world experiments;
learn first principles using the knowledge base, wherein the first principles are foundational principles that cannot be deduce from other principles, and wherein learning the first principles is based on kinematic parameters of motion of an object, estimated structural parameters of the object, and a relationship between the kinematic parameters and control parameters of the object based on the estimated structural parameters of the object;
create control commands for controlling the object based on the first principles derived from the knowledge base;
generate constraints for the control commands;
perform constrained reinforcement learning by executing the control commands with the constraints,
utilize feedback from the constrained reinforcement learning to improve the control commands; and
enrich the knowledge base based on the feedback.

12. The system of claim 11, wherein the object is a vehicle, and wherein the first principles comprises first principals of vehicle motion.

13. The system of claim 11, wherein the one or more processors further execute the instructions to receive a current state, a target state, and a reference to the knowledge base as input parameters.

14. The system of claim 13, wherein the one or more processors further execute the instructions to:
break a control task down into separate components according to the current state and the target state;
create a query for each of the separate components of the control task;
retrieve a corresponding query result from the knowledge base for each query to generate a plurality of query results; and
combine the query results to generate a control command for the control task.

15. The system of claim 14, wherein the one or more processors further execute the instructions to combine the query results according to corresponding weights assigned to the separate components of the control task.

16. The system of claim 11, wherein the constraints for the control commands include hard constraints that specify conditions that cannot be exceeded.

17. The system of claim 11, wherein the constraints for the control commands include soft constraints that specify preferable conditions.

18. The system of claim 11, wherein the one or more processors further execute the instructions to:
generate a first subset of constraint items based on a state of an operating environment;
generate a second subset of constraint items for a set of filtered moving objects based on a state of a host machine and a target state;
generate a third subset of constraint items for a set of filtered stationary obstacles; and
combine the first subset of constraint items, the second subset of constraint items, and the third subset of constraint items.

19. The system of claim 11, wherein the one or more processors further execute the instructions to:
decompose the control commands into multiple categories and dimensions to enable learning of the control commands in each category and dimension separately;
generate control command candidates for a control command based on a current state;
apply the constraints to the control command candidates;
refine the control commands based on past experiences when the current state is a learned state; and
adapt results from learned states to new environments when the current state is not the learned state.

20. A non-transitory computer readable medium storing computer instructions, that when executed by one or more processors, cause the one or more processors to perform the steps of:
creating a knowledge base comprising data obtained from real-world experiments;
learning first principles using the knowledge base, wherein the first principles are foundational principles that cannot be deduce from other principles, and wherein learning the first principles is based on kinematic parameters of motion of an object, estimated structural parameters of the object, and a relationship between the kinematic parameters and control parameters of the object based on the estimated structural parameters of the object;
creating control commands for controlling the object based on the first principles derived from the knowledge base;
generating constraints for the control commands;
performing constrained reinforcement learning by executing the control commands with the constraints,
utilizing feedback from the constrained reinforcement learning to improve the control commands; and
enriching the knowledge base based on the feedback.

* * * * *